United States Patent
Ward et al.

(10) Patent No.: US 9,645,559 B1
(45) Date of Patent: May 9, 2017

(54) HEAD-UP DISPLAY SCREEN

(71) Applicant: ThruView Technologies Inc., The Woodlands, TX (US)

(72) Inventors: Gregory A. Ward, The Woodlands, TX (US); Evan L. Gooch, Houston, TX (US)

(73) Assignee: RIGMINDER OPERATING, LLC, The Woodlands, TX (US)

( * ) Notice: Subject to any disclaimer, the term of this patent is extended or adjusted under 35 U.S.C. 154(b) by 471 days.

(21) Appl. No.: 14/102,143

(22) Filed: Dec. 10, 2013

Related U.S. Application Data

(60) Provisional application No. 61/864,245, filed on Aug. 9, 2013.

(51) Int. Cl.
| | | |
|---|---|---|
| *G05B 11/01* | (2006.01) | |
| *G03H 1/00* | (2006.01) | |
| *G05B 15/00* | (2006.01) | |
| *G02B 27/14* | (2006.01) | |
| *G05B 15/02* | (2006.01) | |
| *E21B 7/00* | (2006.01) | |

(52) U.S. Cl.
CPC ............... *G05B 15/02* (2013.01); *E21B 7/00* (2013.01)

(58) Field of Classification Search
CPC ....... E21B 7/00; G05B 15/02; G02B 27/0103; G02B 5/32; G02B 27/0172; G02B 27/0101
USPC .......................... 700/17, 19, 83; 359/13, 630
See application file for complete search history.

(56) References Cited

U.S. PATENT DOCUMENTS

| | | | |
|---|---|---|---|
| 2,346,257 A | 4/1944 | Hehn | |
| 4,616,321 A | 10/1986 | Chan | |
| 4,794,534 A | 12/1988 | Millheim | |
| 5,005,009 A * | 4/1991 | Roberts | B32B 17/10036 340/980 |
| 5,473,447 A * | 12/1995 | Molteni | G02B 27/0103 359/13 |
| 5,574,579 A * | 11/1996 | Molteni | G02B 27/0103 359/22 |
| 5,751,576 A * | 5/1998 | Monson | A01M 7/0089 239/161 |
| 6,639,569 B2 * | 10/2003 | Kearns | G02B 27/0101 345/7 |
| 6,873,267 B1 | 3/2005 | Tubel et al. | |
| 6,873,376 B1 * | 3/2005 | Rofe | G02B 27/01 345/174 |
| 6,980,929 B2 | 12/2005 | Aronstam et al. | |
| 7,126,583 B1 * | 10/2006 | Breed | B60K 35/00 345/158 |

(Continued)

FOREIGN PATENT DOCUMENTS

WO    WO 2013033780    3/2013

*Primary Examiner* — Ronald Hartman, Jr.
(74) *Attorney, Agent, or Firm* — K&L Gates LLP

(57) ABSTRACT

A head-up display screen improves the ability of operators to operate equipment, allowing operators to view the equipment through a transparent window and view information about the equipment on an at least semitransparent display screen overlapping the transparent window, while minimizing obstruction to the view of the equipment. A head-up display screen may include touch capabilities, allowing operators to modify a display while viewing the equipment. A head-up display screen may be rugged and durable for an oil rig environment.

22 Claims, 3 Drawing Sheets

(56) References Cited

U.S. PATENT DOCUMENTS

| | | | |
|---|---|---|---|
| 7,931,096 B2 | 4/2011 | Saha | |
| 8,872,639 B2 * | 10/2014 | Kinoshita | B60K 35/00 340/425.5 |
| 8,970,453 B2 * | 3/2015 | Sasaki | G01C 21/365 340/461 |
| 9,008,904 B2 * | 4/2015 | Szczerba | G02B 27/01 340/691.6 |
| 2006/0187544 A1 | 8/2006 | Wiener et al. | |
| 2008/0291537 A1 | 11/2008 | Choi | |
| 2010/0199228 A1 | 8/2010 | Latta et al. | |
| 2010/0253526 A1 | 10/2010 | Szczerba et al. | |
| 2010/0253539 A1 * | 10/2010 | Seder | G01S 13/723 340/903 |
| 2012/0026002 A1 | 2/2012 | Vu et al. | |

* cited by examiner

HEAD-UP DISPLAY SCREEN

CROSS-REFERENCE TO RELATED APPLICATIONS

This application claims the benefit of U.S. Provisional Application No. 61/864,245, filed Aug. 9, 2013, the disclosure of which is incorporated herein by reference in its entirety.

BACKGROUND

Drilling on an oil rig involves dangerous operations. In order to enhance safety, a team leader, often known as a driller or drill operator, may oversee a drilling process. A driller may be responsible for a crew and may run a rig. Thus, a driller may monitor a rig's operations. Such monitoring may comprise visually viewing a rig, as well as interpreting signals and information coming from a rig platform. A driller may also be responsible to take appropriate countermeasures in the event of an emergency.

An inattentive driller poses a significant risk to a drilling operation. A driller may be working in a cabin, known as a doghouse, in which a window overlooks a rig floor. Thus, while viewing a rig through a doghouse window, a driller can supervise the work of a crew and visually oversee safe and proper operations of a rig. A doghouse may also contain several instrumentation monitors that assist a driller in controlling a rig. Such doghouse monitors may be placed to the side of a window, so that a driller's view through the doghouse window is not obstructed. However, because a driller may need to divert attention away from the window in order to view the information provided on the monitors, a driller may inadvertently become inattentive to what is happening on a rig floor. As a result, a driller's viewing of the instrumentation monitors can prevent the driller from paying sufficient attention to what is happening on the rig floor.

Inattentiveness of an operator is a concern in numerous operating environments. In a manufacturing environment, an operator may become inattentive while controlling machines and tools that produce goods. For example, it may be that a product is manufactured from raw materials that pose potential ecological risks. Thus, the transformation of such hazardous raw materials into finished goods may be isolated in a room separate from the operator. The operator may safely view the manufacturing machinery through a window, but may need to look away at information provided on a nearby monitor. Operator inattentiveness could inadvertently cause a breach of containment of the raw materials, possibly causing an industrial disaster that threatens lives and the surrounding ecosystem. Accordingly, there is a need for systems and methods to improve operator attentiveness and operation of a remotely viewed worksite.

BRIEF SUMMARY

An embodiment of the present invention allows a user to see pertinent information displayed in front of the user, while not blocking a user's view of controlled equipment. An embodiment of the present invention allows for an interactive, head-up approach to drilling. Other embodiments of the present invention allow for an interactive, head-up approach to a variety of environments, such as manufacturing, mining, maritime, and construction, among others. For example, embodiments of the present invention may include heavy equipment capable of at least one of loading, excavating, material handling, paving, boring, pumping, driving, and navigating, among others. For further example, embodiments of the present invention may include machinery capable of at least one of casting, molding, forming, machining, joining, crushing, blasting, printing, and chemical processing, as well as others.

In one aspect, a system for controlling drilling carried out with an oil rig is provided that includes a drilling unit; an enclosure comprising a viewing port facing at least a portion of the drilling unit, the portion of the drilling unit viewable through the viewing port; at least one sensor configured to measure at least one parameter of the drilling unit; a display component that includes a display screen positioned proximate at least a portion of the viewing port, wherein the display screen is at least semitransparent; a projection device for projecting an image onto the display screen; a gesture-detector to detect an input gesture of a user; a processor communicatively coupled to the at least one sensor and the display component; and a memory communicatively coupled to the processor, the memory bearing processor-executable instructions that, when executed on the processor, cause the processor at least to receive the at least one parameter from the at least one sensor; generate an image for projection by the projection device onto the display screen based on the at least one parameter; and receive input-gesture data from the gesture detector, the input-gesture data corresponding to the detected input gesture of the user.

In another aspect, a method of controlling equipment can be summarized as viewing the equipment through a viewing port; viewing equipment information displayed on a display screen, the display screen positioned proximate a viewing port such that a portion of the display screen overlaps a portion of the viewing port; and controlling the equipment based on viewing the equipment and the equipment information.

DETAILED DESCRIPTION

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

For purposes of this disclosure, the term transparent generally means allowing light to pass through with no interruption or distortion. For example, a typical glass window would be considered transparent. The term semitransparent means almost transparent, in which there is little interruption or distortion of light passing through, such that viewed objects may be clearly distinguished. For example, a typical screen door mesh would be considered semitransparent.

Figure 1:
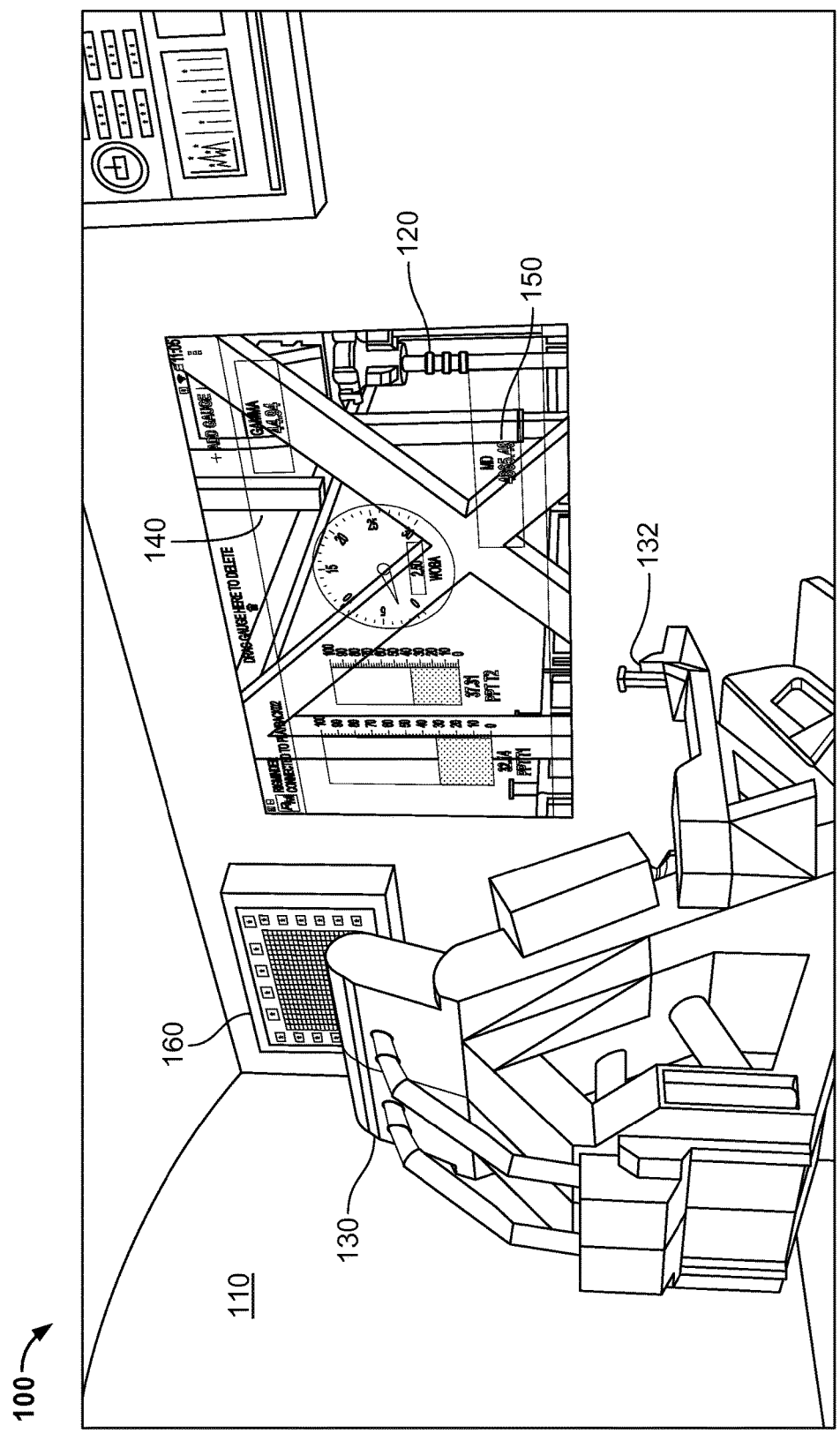
FIG. 1 illustrates a perspective view of an exemplary environment in which embodiments of the display screen may be used.

FIG. 1 illustrates a perspective view of an exemplary environment 100 in which embodiments of the display screen may be used. The environment 100 depicts an enclosure 110, such as, for example, an oil rig doghouse, in which a driller or drill operator may control and monitor equipment 120 located outside of the enclosure 110. While the enclosure 110 illustrated in FIG. 1 is a drilling rig doghouse, any structure containing the driller may be utilized, such as, for example, a cabin, a building, a shack, a shed, and the like. The controlled equipment 120 may be, for example, drilling rig machinery for drilling holes into the ground. A driller may be seated at a control chair 130 comprising a control mechanism 132 for controlling the operation of the rig machinery 120. Alternatively, a driller may use a control console or other input device to control the rig machinery 120.

A viewing port 140 (e.g., a window) enables the driller in the doghouse 110 to view the controlled equipment 120 outside of the doghouse 110. The viewing port 140 may face a floor of the drilling rig, and a driller may view the rig floor and rig machinery 120 through the window 140 while seated at the control chair 130 or while moving about the doghouse. The window 140 may comprise an opening in the wall of the doghouse 110, or may comprise an opening having a transparent sheet, such as a sheet of glass or acrylic plastic, that protects the interior of the doghouse 110 from external elements, such as rain or snow.

The environment 100 includes a head-up display ("HUD") component 150, which may provide a driller with information regarding the rig machinery 120 without substantially obstructing a driller's view through the viewing port 140. The HUD 150 may comprise a screen and a projector for projecting a video image onto the screen. The screen may comprise a transparent material, such as glass, or a semitransparent material, such as mesh. The screen may be positioned in front of or behind a glass pane in the viewing port 140, or may be positioned within the viewing port 140 in place of a glass pane. The projector may be positioned in front of or behind the screen to project an image onto the screen (e.g., rear-project or front-projection). The HUD 150 may also include touch-enabled or gesture-controlled functionality, so as to detect movement of the driller's fingers across the surface of the screen and to interpret such detections as user inputs, similar to commercially-available touch-enabled tablet computing devices. Touch-enabled or gesture-controlled functionality allows a driller to provide user inputs to software generating the video images on the HUD 150. These user inputs may be used to modify the presentation of information on the HUD 150, as well as allowing for the input of information by a driller.

As is known in the art, a dedicated display monitor 160 may also provide a driller with information regarding the rig machinery 120. In order to enable the driller to maintain his view of the rig machinery 120 through the window 140, the display monitor 160 may be placed on the wall of the doghouse 110 to the side of the viewing port 140 so that the placement does not obstruct a driller's view through the viewing port 140.

Figure 2:
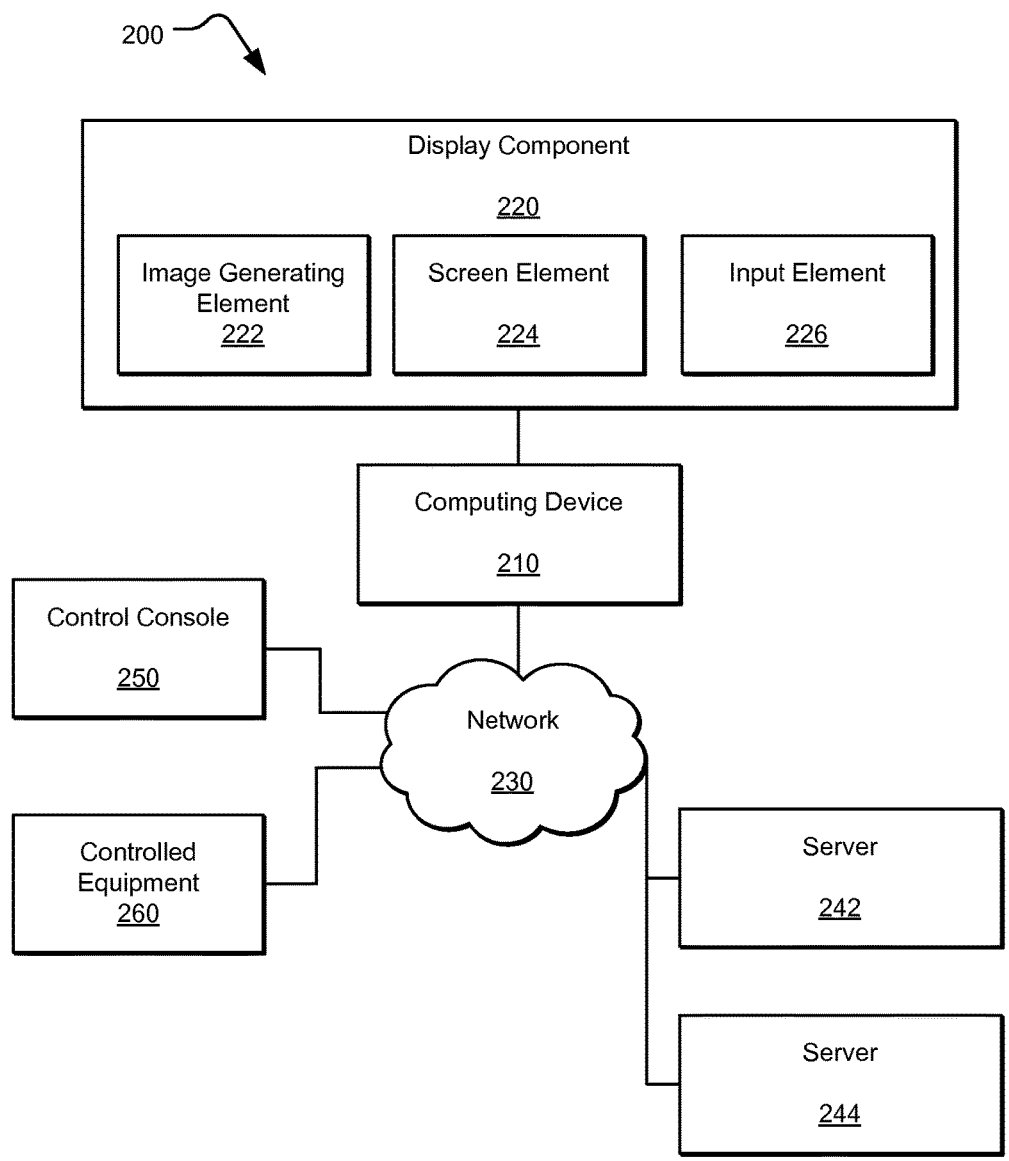
FIG. 2 illustrates an exemplary environment in which embodiments of the display screen may be used.

FIG. 2 illustrates an exemplary environment 200 in which embodiments of the display screen may be used. In a typical system environment 200, there may be a computing device 210, such as a desktop personal computer ("PC"). A computing device 210 may include a processor, a memory, a communications interface, and a user interface for receiving user input. In other embodiments, the computing device 210 can be, for example, a server, a smart phone, a notebook computer, a personal data assistant, a cellular phone, or other computational system. The computing device 210 may run any of a variety of operating systems, such as a version of the Android operating system by Google, Inc., Microsoft Windows operating system, the Mac OS or iOS by Apple, Inc., a UNIX-based or LINUX-based operating system.

The computing device 210 can include one or more user interfaces operable to receive inputs from a user. A user interface can include, for example, a push button, touch pad, touch monitor, wheel, joystick, keyboard, mouse, trackball, keypad or any other such device or element whereby a user can provide inputs to the computing device 210. These user interfaces may be incorporated into the computing device 210 or operably coupled to the computing device via a wired or wireless interface. For example, a computing device 210 may be operably coupled to a display component 220 having a user interface of an input element 226, which may provide user input to the computing device 210.

The computing device 210 may be communicatively coupled to a display component 220. The display component 220 may comprise an image generating element 222. In some embodiments, the image generating element 222 may comprise technologies such as CRT, LCD, LED, laser, or plasma. The image generating element 222 may comprise a video projector that receives a video signal from the computing device 210 and projects the corresponding image on the screen element 224 using a lens system. The image generating element 222 may project an image generated by the computing device 210 onto a separate surface, such as a screen element 224, either from the front of the screen element 224 or from behind. A screen element 224 may be equipped with features capable of displaying an image projected thereupon while remaining transparent or semitransparent such that a user can clearly observe an object through the screen element 224.

A screen element 224 may comprise glass, plastic, polymer, mesh or other transparent or semitransparent medium. A mesh may be a fiberglass mesh, a polymeric mesh (e.g., a polyvinyl chloride or PVC mesh, a PVC coated mesh, or a polyester mesh), or a mesh of other materials such as metallic, synthetic, or natural material, and combinations of such. A mesh may comprise loosely woven wire, fiber, or thread, similar to a screen mesh used to create screen doors and window screens. Such mesh is advantageous because it is both durable and at least semitransparent. Transparency of the mesh may be increased or decreased based in part on the width of fiberglass thread and the tightness of the weave of the thread. For example, a mesh may be made of loosely woven fiberglass thread forming a crisscross pattern. A mesh size, denoted as number of openings per inch, may be an 18×16 mesh which has 18 openings across (warp) and 16 openings down (fill) per each square inch of the screen.

A mesh may have a texture and depth that promotes visibility of an image from various angles when an image is projected on the mesh. Accordingly, a driller may view images projected on the mesh even when not seated in a control chair. Additionally, a mesh may be painted with a coat of matte white paint, light-reflective paint, or the like in order to improve the visibility of an image projected on the mesh. Such a coating of paint does not substantially detract from the transparency of the mesh.

A mesh may be installed in a frame in order, for example, to hold the mesh in a taut position. The frame may be placed in a viewing port 140, for example, a doghouse window, to fully cover the opening of the viewing port 140. Alternatively, the frame size for the mesh may be larger than the viewing port 140, allowing for projection of images on the mesh that is backed by a portion of a wall near the viewing port 140. The frame size for the mesh may alternatively be smaller than the viewing port 140, thereby partially covering the viewing port 140 and allowing for a view through the portion of the viewing port 140 not covered by a mesh. The mesh may be touching the viewing port 140, or may be separated from the viewing port 140, allowing for an optimal placement of the mesh in relationship to where a user is located.

A screen element 224 comprising a mesh may provide an improved side viewing angle, increased independence from ambient light, lower cost, better strength, longer durability, and/or increased environmental resistance to a harsh environment.

In embodiments described above, the image generating element 222 and the screen element 224 are provided as separate components. Alternatively, they may comprise a single device. For example, a commercially-available transparent display may be utilized, such as the NL22B 22" LED LCD Transparent Display by Samsung Electronics. Technologies that may be utilized for display screens may include projection mechanisms with transparent projection elements, transparent liquid crystal display (LCD) screens, transparent organic light emitting diode (OLED) screens, laser projections, and wearable monitors. With transparent LCD screens, a projection device may generate an image on a display screen by applying an electrical field to the display screen to turn pixels on and off.

The computing device 210 may be communicatively coupled to an input element 226 of the display component 220. The input element 226 may be touch-based, which may utilize technologies such as capacitive, resistive, projected capacitive, surface acoustic wave, near field imaging, infrared, 3-D camera, and the like. The input element 226 may, for example, be a gesture-control device that tracks a user's gestures such as hand movements without requiring the user to physically contact the screen element 224. For example, a user's gestures may be tracked using a gesture sensor, such as a 3D camera based system, such that a user's movements may be interpreted as controls of an application being executed by the computing device 210. The input element 226 may, alternatively, incorporate a touch sensitive surface onto the screen element 224, such as a capacitive, resistive, or infrared touch sensitive surface. If, for example, an infrared touch frame is utilized, it may be aligned in front of the screen element 224. Alternatively, the input element 226 may utilize technologies such as a mouse or a joystick.

A screen element 224 may be constructed with the following process Kilz Latex Primer may be diluted to six parts primer to one part water. The diluted primer may be applied with a spray gun to one side of a heavy duty window screen with a 29-inch by 49-inch dimension, such as New York Wire's Charcoal Pet Screen. A 55-inch corner-to-corner frame may be constructed from 80/20 Inc.'s one-inch by one-inch extruded-aluminum T-slotted frame profiles. Edges of the heavy duty window screen may be inserted into the slots of the aluminum frame profiles, and rubber mounting strips may maintain tension of the window screen within the frame. A PQ Labs Multi-Touch G4S may be assembled according to manufacturer instructions, such that glass is adhered to an Infrared touch frame. Utilizing double-sided tape, the Infrared touch frame of the PQ Labs Multi-Touch G4S may be mounted to the T-slotted frame profiles, such that the Multi-Touch G4S is mounted on the same side of the window screen that was coated with the diluted primer. A projector may then be aligned to project an image through the glass of the Multi-Touch GRS and onto the coated side of the window screen.

The computing device 210 may access a network 230 that may be a local area network or a wide area network, such as the Internet. The computing device 210 may access the network via an access point, such as a wired or wireless router. The computing device 210 may be used to access various servers 242, 244 via the network 230. The network 230 may comprise multiple communication networks working in conjunction with multiple servers. Data may be communicated to and from servers utilizing the Wellsite Information Transfer Specification (WITS), the Wellsite Information Transfer Standard Markup Language (WITSML), or the like, as well as utilizing a relational database management system such as Structured Query Language (SQL).

The computing device 210 may also communicate with a control console 250, which may control the controlled equipment 260. The control console 250 may, for example, be incorporated into a chair and/or a desk. The computing device 210 may interact with a sensor that measures one or more parameters of the controlled equipment 260. The controlled equipment 260 may, for example, be a drilling unit comprising a drill bit for penetrating through earth formations.

The exemplary environment 200 permits a user to view information on the screen element 224, which does not substantially obstruct the user's view through a viewing port. The exemplary environment 200 also permits a user to control the display of information on the screen element 224 with gestures and/or touches directed to an input element 226. Accordingly, a display component 220 may be located at a remote viewing location from equipment, tools or machines being controlled, such as a drill, a crane, a vehicle, and other heavy machinery or light instruments.

Figure 3:
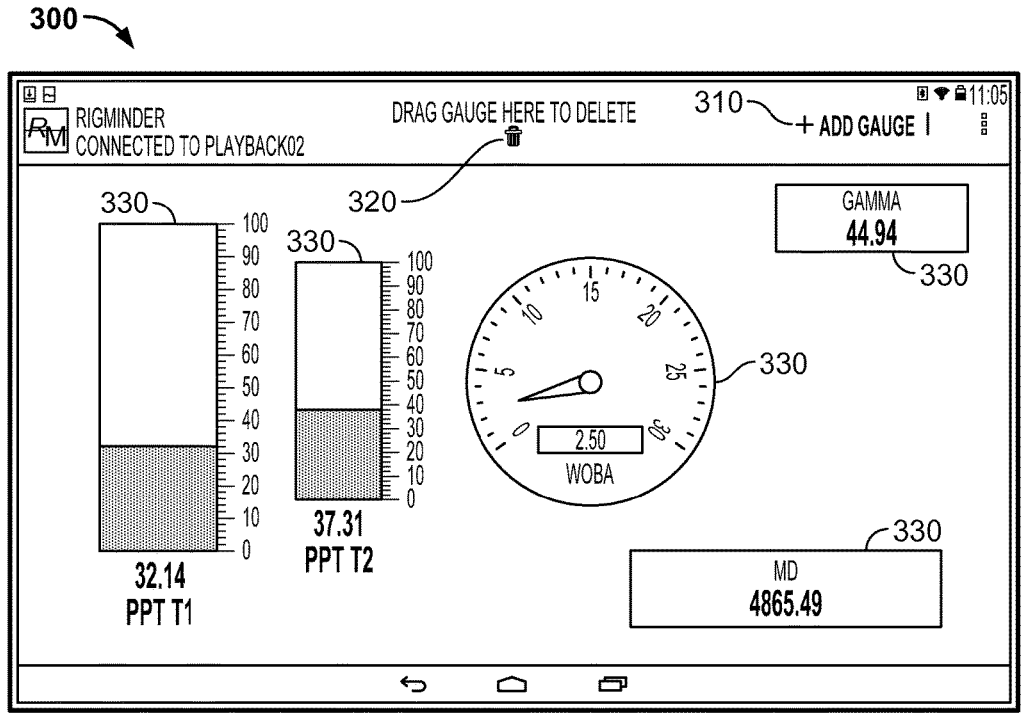
FIG. 3 illustrates an exemplary display screen in accordance with various embodiments.

FIG. 3 illustrates an exemplary display screen 300 in accordance with various embodiments. In the illustrated embodiment, five images of control types 330 are displayed, respectively labeled PPT T1, PPT T2, WOBA, Gamma, and MD. A user may add a control type 330 with the ADD GAUGE control 310, and a user may remove a control type 330 with the DRAG GAUGE HERE TO DELETE control 320. Additionally, a user may remove a control type 330 by dragging it off the screen. A control type may be, for example, a gauge, an indicator, a tank, a chart, dial, and the like.

Control types may help a user visualize information that may be useful in the operation of an object. For example, a user may analyze engines and generators, geology data, down hole telemetry, rig functionality such as mud analysis, pump monitoring, temperature controls, torque, revolutions per minute, flow rates, and the like. Control types may display information including: drill string weight, pump pressure, pump strokes, stand pipe pressure, directional Rosebud display detailing tool face orientation, rotary revolutions per minute, penetration rate, weight on bit, differential pressure, engine revolutions per minute, engine temperature, transmission temperature, mud tank fluid volume, trip tank volume, mud temperature, flow rates, water tank volume, diesel tank volume, and engine monitoring. In addition, information may be displayed related to the functionality of a drilling rig including: daily operations reports, horizontal drilling program drawings and charts as well as numerical data, gamma or resistivity well logging data, Ouija board tool face planner, and electronic drilling recorder data.

Data may be displayed in various ways on the display screen 300. For example, there may be digital indicators, tank indicators, gauges, dials, graphs, charts, and Boolean indicators. Such images may be added, removed, or modified by the user through touch or other input capabilities. A user may select any combination of indicators and gauges to display. A user may also choose colors, sizes, shapes, locations, maximums, minimums, labels, and the like. Accordingly, a user may customize a display based on the user's preferences, and this customization may be saved as a template for use at a different time.

As described above, touch and/or gesture recognition capabilities may be incorporated into the display screen 300. Some touch maneuvers may be one touch while others may be two touches. There may be more touches, such as when multiple people are operating controlled equipment. Additionally, a user may draw on the display screen 300, for example, by initiating a draw mode, in which the drawing is done through gestures and/or touches.

The screen may also display streaming video in addition to data. Such allows for teleconferencing, training, and the like. Additionally, cameras may capture video to allow the user to see different views of the controlled equipment, such as the back of the controlled equipment that cannot be seen through a viewing port.

An operator at a remote viewing location may visually monitor controlled equipment, while also monitoring operational data. Such operational data may include tool data (e.g., load data and pump pressure data), plan data (e.g., difference between plan and actual data), and site information (e.g., geology of rock, Gamma, and resistivity).

As shown, the images to be displayed are a light color (such as white), and the background is a dark color (such as black), which is sometimes referred to as an inverse display. Such coloring, in combination with a mesh screen, facilitates the illusion that the image floats in midair, but does not substantially block the field of view. Alternatively, the images may be a dark color and the background may be a light color.

Figure 4:
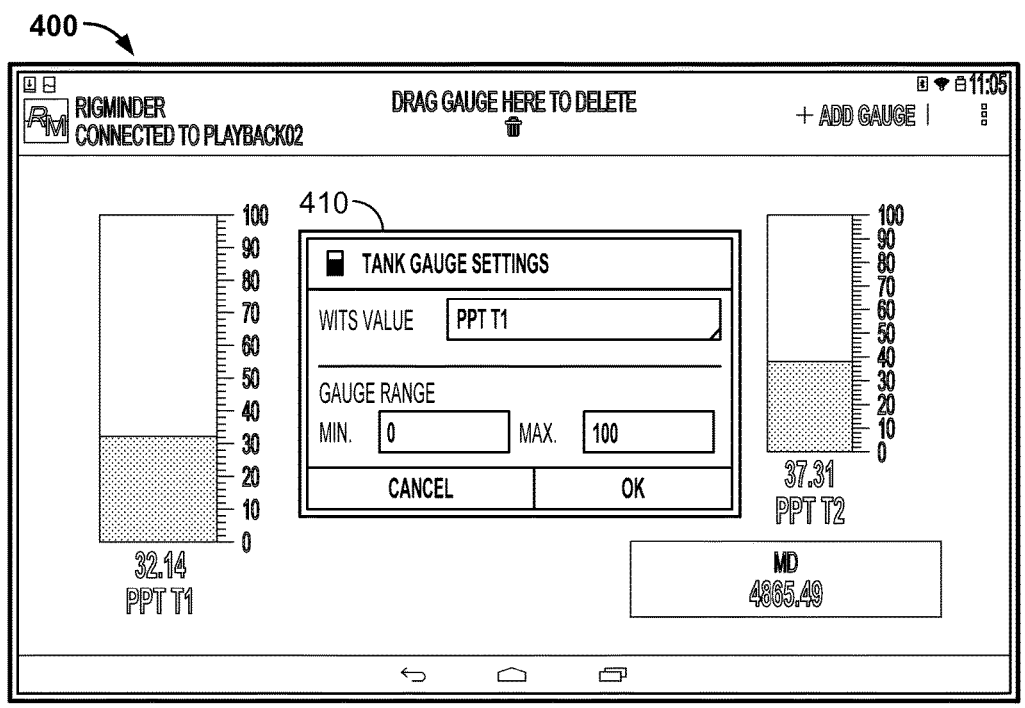
FIG. 4 illustrates an exemplary display screen in accordance with various embodiments.

FIG. 4 illustrates an exemplary display screen 400 in accordance with various embodiments. In the illustrated embodiment, a dialog box 410 is displayed, allowing for user input. As shown, dialog box 410 allows the adjustment of a tank gauge setting, in which the WITS value may be chosen, and the range of the gauge may be indicated. Thus, the dialog box 410 facilitates the customization of the display of a display screen 400. For example, a user may control colors, ranges, tick mark spacing, fill patterns, opacity, and behaviors such as locking, positioning, and resizing.

Embodiments of the present invention may provide various advantages not provided by prior art systems. For example, the display screen can provide for an operator of an object viewing the object to be controlled. In comparison, prior art systems provide for an operator being in an object that is controlled, such as a car, and the operator is viewing the landscape surrounding the object, not the object itself.

While the invention has been described in terms of particular embodiments and illustrative figures, those of ordinary skill in the art will recognize that the invention is not limited to the embodiments or figures described. For example, the illustrated embodiment of the display screen is utilized on an oil rig. In other embodiments, the display screen is located at a remote viewing location from equipment being controlled, such as construction, medical, military, marine environments, or the like. For example, with respect to manufacturing equipment, a robotics technician operating from a clean or sanitized room can monitor a robot's functionality while looking at the display screen attached to the inside of a viewing window. For further example, with respect to cranes (e.g., construction cranes, container loading cranes, heavy lift barge cranes, offshore drilling platform cranes), an operator can view operational data of a crane while looking at the display screen attached to the inside of the viewing window. For further example, with respect to marine equipment (e.g., maritime supply vessels, tenders, tugboats), an operator can view operational data, including navigation data, while looking at the display screen attached to the inside of a viewing window. It is to be appreciated that the ability to view operational data while looking at a display screen attached to the inside of a viewing window is beneficial to a variety of environments and equipment such as coiled tubing units, frac trucks, remote command centers, and wireline trucks. For example, a display screen may be attached to the inside of a window of a cabin of a vehicle, such as a truck, car, or ship, in order to control the operation of equipment located outside of the cabin.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A system for controlling drilling carried out with an oil rig, the system comprising:
    a drilling unit;
    an enclosure comprising a viewing port facing at least a portion of the drilling unit, the portion of the drilling unit viewable through the viewing port;
    at least one sensor configured to measure at least one parameter of the drilling unit;
    a display component comprising:
        a display screen positioned proximate at least a portion of the viewing port, wherein the display screen is semitransparent or transparent;
        a projection device for projecting an image onto the display screen; and
        a gesture-detector configured to detect an input gesture of a user;
    a processor communicatively coupled to the at least one sensor and the display component; and
    a memory communicatively coupled to the processor, the memory bearing processor-executable instructions that, when executed on the processor, cause the processor at least to:
        receive the at least one parameter from the at least one sensor;
        generate an image for projection by the projection device onto the display screen based on the at least one parameter; and
        receive input-gesture data from the gesture detector, the input-gesture data corresponding to the detected input gesture of the user.

2. The system of claim 1, wherein the display screen comprises a fiberglass mesh coated with a matte white paint.

3. The system of claim 1, wherein the display screen comprises a transparent liquid crystal display screen and wherein the projection device projects an image onto the display screen by applying an electric field to the transparent liquid crystal display screen.

4. The system of claim 1, further comprising:
    a console located in the enclosure to control the drilling unit,
    wherein the processor is communicatively coupled to the console and the processor is further caused by the processor-executable instructions at least to:
        determine from the input-gesture data a corresponding command to control the drilling unit; and
        transmit to the console the corresponding command.

5. A system for controlling equipment, the system comprising:
    a viewing port facing at least a portion of the equipment, the portion of the equipment viewable through the viewing port, wherein the viewing port is located on a wall;
    at least one sensor configured to measure at least one parameter of the equipment;
    a display component comprising:
        a display screen positioned proximate at least a portion of the viewing port, wherein the display screen is semitransparent or transparent; and
        a projection device for projecting an image onto the display screen;
    a processor communicatively coupled to the at least one sensor and the display component; and
    a memory communicatively coupled to the processor, the memory bearing processor-executable instructions that, when executed on the processor, cause the processor at least to:
        receive the at least one parameter from the at least one sensor; and
        generate an image for projection by the projection device onto the display screen based on the at least one parameter.

6. The system of claim 5, wherein the viewing port is located on the wall of a drilling operation doghouse or the wall of maritime supply vessel.

7. The system of claim 5, wherein the viewing port is located on an exterior surface of a structure, the display screen is facing an interior portion of the structure, and the equipment is located external to the structure.

8. The system of claim 5, wherein the viewing port is located on the wall of a room, the display screen is facing an interior portion of the room, and the equipment is located external to the room.

9. The system of claim 5, wherein the display screen comprises a fiberglass mesh.

10. The system of claim 9, wherein the fiberglass mesh is coated with a matte white paint.

11. The system of claim 5, wherein the display screen comprises a transparent liquid crystal display screen.

12. The system of claim 11, wherein the projection device projects an image onto the display screen by applying an electric field to the transparent liquid crystal display screen.

13. The system of claim 5, wherein:
    the display component further comprises a gesture-detector configured to detect an input gesture of a user, and
    the processor-executable instructions that, when executed on the processor, further cause the processor at least to:
        receive input-gesture data from the gesture detector, the input-gesture data corresponding to the detected input gesture of the user.

14. The system of claim 13, wherein the user creates the input gesture by touching the display screen.

15. The system of claim 13, wherein the user creates the input gesture by user movements in physical space.

16. The system of claim 13, further comprising:
a console to control the equipment,
wherein the processor is communicatively coupled to the console and the processor is further caused by the processor-executable instructions at least to:
determine from the input-gesture data a corresponding command to control the equipment; and
transmit to the console the corresponding command.

17. A method of controlling equipment, the method comprising:
viewing the equipment through a viewing port located on a wall;
viewing equipment information displayed on a display screen, the display screen positioned proximate the viewing port such that a portion of the display screen overlaps at least a portion of the viewing port; and
controlling the equipment based on viewing the equipment and the equipment information.

18. The method of claim 17, further comprising:
modifying an image of the equipment information displayed on the display screen based at least on a gesture directed to the display screen.

19. The method of claim 17, further comprising:
measuring at least one parameter of the equipment by at least one sensor,
wherein the equipment information displayed on the display screen comprises an image of the at least one parameter.

20. The method of claim 17, further comprising:
detecting an input gesture of a user; and
determining a command that controls the equipment that corresponds to the detected input gesture,
wherein the controlling the equipment is based at least on the determined command.

21. A system for controlling equipment, the system comprising:
a viewing port facing at least a portion of the equipment, the portion of the equipment viewable through the viewing port;
at least one sensor configured to measure at least one parameter of the equipment;
a display component comprising:
a display screen positioned proximate at least a portion of the viewing port, wherein the display screen is semitransparent or transparent and comprises a fiberglass mesh; and
a projection device for projecting an image onto the display screen;
a processor communicatively coupled to the at least one sensor and the display component; and
a memory communicatively coupled to the processor, the memory bearing processor-executable instructions that, when executed on the processor, cause the processor at least to:
receive the at least one parameter from the at least one sensor; and
generate an image for projection by the projection device onto the display screen based on the at least one parameter.

22. A system for controlling equipment, the system comprising:
a viewing port facing at least a portion of the equipment, the portion of the equipment viewable through the viewing port;
at least one sensor configured to measure at least one parameter of the equipment;
a display component comprising:
a display screen positioned proximate at least a portion of the viewing port, wherein the display screen is at last semitransparent or transparent; and
a projection device for projecting an image onto the display screen;
a gesture-detector configured to detect an input gesture of a user, wherein the input gesture comprises the user touching the display screen;
a processor communicatively coupled to the at least one sensor and the display component; and
a memory communicatively coupled to the processor, the memory bearing processor-executable instructions that, when executed on the processor, cause the processor at least to:
receive the at least one parameter from the at least one sensor;
generate an image for projection by the projection device onto the display screen based on the at least one parameter; and
receive input-gesture data from the gesture detector, the input-gesture data corresponding to the detected input gesture of the user.

\* \* \* \* \*